US010842079B2

(12) United States Patent
Danou

(10) Patent No.: US 10,842,079 B2
(45) Date of Patent: Nov. 24, 2020

(54) CHICK PEA HARVESTING METHOD AND APPARATUS

(71) Applicant: Samir A. Danou, Detroit, MI (US)

(72) Inventor: Samir A. Danou, Detroit, MI (US)

( * ) Notice: Subject to any disclaimer, the term of this patent is extended or adjusted under 35 U.S.C. 154(b) by 289 days.

(21) Appl. No.: 15/887,195

(22) Filed: Feb. 2, 2018

(65) Prior Publication Data

US 2019/0239434 A1    Aug. 8, 2019

(51) Int. Cl.
| A01F 11/00 | (2006.01) |
| A01D 45/24 | (2006.01) |
| A01D 41/12 | (2006.01) |
| A01F 12/18 | (2006.01) |
| A01F 7/04 | (2006.01) |
| A01D 61/00 | (2006.01) |
| A01D 34/04 | (2006.01) |

(52) U.S. Cl.
CPC .............. *A01F 11/00* (2013.01); *A01D 41/12* (2013.01); *A01D 45/24* (2013.01); *A01F 7/04* (2013.01); *A01F 12/18* (2013.01); *A01D 34/04* (2013.01); *A01D 61/004* (2013.01)

(58) Field of Classification Search
CPC ........ A01D 45/24; A01D 45/22; A01D 31/04; A01D 41/12; A01D 34/04; A01D 61/004; A01F 7/04; A01F 12/18; A23N 15/00; A23N 15/10

See application file for complete search history.

(56) References Cited

U.S. PATENT DOCUMENTS

| 1,371,519 | A | * | 3/1921 | Roosa | A01D 45/24 171/54 |
| 1,979,078 | A | * | 10/1934 | Plummer | A23N 15/10 460/149 |
| 2,004,379 | A | * | 6/1935 | Michels | A23N 15/10 99/474 |
| 2,437,155 | A | * | 3/1948 | Dunkley | A23N 15/10 426/481 |
| 2,504,193 | A | * | 4/1950 | Gough | A01D 45/24 56/124 |
| 2,608,973 | A | | 9/1952 | Coons | |
| 2,943,430 | A | | 7/1960 | Carruthers | |
| 3,209,758 | A | | 10/1965 | Nilsson et al. | |
| 3,260,041 | A | * | 7/1966 | McRoberts | A01D 45/22 56/119 |
| 3,306,018 | A | | 2/1967 | Whitman | |

(Continued)

*Primary Examiner* — Thomas B Will
*Assistant Examiner* — Joan D Misa
(74) *Attorney, Agent, or Firm* — Fishman Stewart PLLC

(57) ABSTRACT

A combine for harvesting chick peas includes a first rotatable shaft having components that cut a crop and pass the cut crop in a rearward direction, and a drum that includes an outer shell with stationary threshers and a cut crop opening, a rotatable central mount, a plurality of rotatable threshers. Each of the rotatable threshers is attached to the central rotatable mount and in line with a stationary thresher. A plurality of cutters is attached to the outer shell, a flame source projects a flame into the drum, and a water source projects water into the drum. The cut crop passes into the cut crop opening, to be further cut by the plurality of cutters and threshed by the plurality of rotatable threshers, such that the flame and water are projected onto the cut crop, resulting in a processed crop and detritus that is separated from the processed crop.

20 Claims, 4 Drawing Sheets

(56) References Cited

U.S. PATENT DOCUMENTS

| | | | |
|---|---|---|---|
| 3,351,200 A | | 11/1967 | Burenga |
| 3,580,258 A | | 5/1971 | Stroburg et al. |
| 3,703,802 A | | 11/1972 | Wrestler et al. |
| 3,721,075 A | | 3/1973 | Weiberg |
| 3,797,503 A | | 3/1974 | Dentant et al. |
| 3,998,035 A | | 12/1976 | Towson, Jr. |
| 3,998,036 A | | 12/1976 | Jarrell |
| 4,209,918 A | * | 7/1980 | Klein .................. A01D 41/133 <br> 34/182 |
| 4,581,880 A | | 4/1986 | Klinner |
| 4,587,799 A | | 5/1986 | Thomas et al. |
| 4,951,451 A | | 8/1990 | Klinner |
| 5,210,999 A | | 5/1993 | Cosimati |
| 5,809,759 A | * | 9/1998 | Zyla ..................... A01D 45/003 <br> 56/220 |
| 6,955,597 B2 | * | 10/2005 | Van Beek .............. A01D 45/22 <br> 460/1 |
| 6,960,131 B2 | | 11/2005 | Moser |
| 7,047,690 B2 | | 5/2006 | Moser et al. |
| 7,449,206 B2 | | 11/2008 | Moser et al. |
| 2002/0004418 A1 | * | 1/2002 | Mesquita ............... A01D 41/06 <br> 460/115 |
| 2005/0136159 A1 | | 6/2005 | Avery et al. |
| 2008/0193600 A1 | | 8/2008 | Werstak et al. |
| 2009/0022858 A1 | | 1/2009 | Pawlick |
| 2009/0035433 A1 | | 2/2009 | France et al. |
| 2012/0027897 A1 | | 2/2012 | Innocenzi |
| 2015/0262505 A1 | | 9/2015 | Zaller |
| 2015/0313269 A1 | | 11/2015 | Rodriguez |

\* cited by examiner

CHICK PEA HARVESTING METHOD AND APPARATUS

TECHNICAL FIELD

This disclosure relates generally to a chick pea harvesting method and apparatus and, more particularly, to an apparatus and method of fire-roasting chick peas during harvesting.

BACKGROUND

Chick peas, otherwise known as garbanzo beans, have been cultivated throughout the world for many, many years. The plant typically grows to 20-50 cm in height and has small, feathery leaves on the stem. Chick peas are a type of "pulse," with one seedpod containing typically one to three peas. The chick pea may also be referred to generally and scientifically as *Cicer arietinum*, and is a legume of the family Fabaceae, sub-family Faboideae. Its different types are variously known as gram, Bengal gram, garbanzo, garbanzo bean, and Egyptian pea, as examples.

Several varieties of chickpea are cultivated throughout the world, including Desi chana and *Cicer reticulatum* as examples. In one example, Chick peas are referred to, on occasion, as garbanzo beans, which in some examples are called "kabuli" chana. Chick peas are harvested throughout the world, including Turkey, Ethiopia, Mexico, Iraq, Iran, the Mediterranean, Southern Europe, Northern Africa, South America, the Indian subcontinent, and in the United States, as examples.

Thus, in general, this disclosure is related to the harvested pea of any legume of the family Fabaceae as described herein, and is referred to hereinafter as "chick pea."

Chick peas are annuals that are typically planted in a cool environment, often after the last average frost. Chick peas can be harvested as green chick peas, or upon maturity for use as dried chick peas. When harvested as green chick peas, the green pods are picked from the plant at approximately 100 days from planting, and gathered for subsequent processing. The optimal time for processing green chick peas for human consumption depends on such variables as the variety of chick pea, growing conditions, soil conditions, and the like. Typically, green chick peas are stored for several days, or they may be blanched or steamed, and then frozen for later use or consumption.

Mature chick peas may be harvested from 3 to several months from planting, when they reach full maturity (depending on the variety and growing conditions). When mature, the plants may be cooked and eaten in salads, or used for other food products such as in stews, to make flour, and to shape into balls and fried as falafel, as examples.

However, given the overall focus in healthier eating worldwide, chick peas have come under greater scrutiny in recent years as a healthy alternative to other and more traditional grains and other foods. For instance, chick peas are a nutrient-dense food and provide a rich content of protein, dietary fiber, and folate. Chick peas also include minerals such as iron and phosphorus, and they also provide high levels of thiamin, vitamin B6, magnesium, and zinc. Chick peas in certain prepared forms also may include proteins and they may be rich in essential amino acids.

Thus, there is a continuing need to provide chick peas for human consumption in forms that are widely palatable, providing alternatives to other modern foods that may have lower nutritional value.

BRIEF DESCRIPTION

The disclosed subject matter is directed toward an apparatus and method of harvesting chick peas.

According to the disclosure, a combine for harvesting chick peas includes a first rotatable shaft having components attached thereto that cut a crop and pass the cut crop in a rearward direction of the combine and a drum. The drum includes an outer shell having a plurality of stationary threshers and a cut crop opening, a rotatable central mount, a plurality of rotatable threshers therein, each of the rotatable threshers attached to the central rotatable mount and in line with at least one respective stationary thresher, a plurality of cutters attached to the outer shell, and a product chute at a base of the drum. The drum also includes an exit opening on a first end of the drum, a flame source positioned to project a flame into the drum, and a water source positioned to project water into the drum. The cut crop is caused to pass into the cut crop opening, to be further cut by the plurality of cutters and threshed by the plurality of rotatable threshers, such that the flame is projected onto the cut crop, and the water is projected onto the cut crop, resulting in a processed crop and detritus that is separated from the processed crop.

According to the disclosure, a method of manufacturing a combine for harvesting chick peas includes attaching components to a first rotatable shaft that cut a crop and pass the cut crop in a rearward direction of the combine, and providing a drum having an outer shell, the drum having a plurality of stationary threshers, a cut crop opening, a product chute at a base of the drum, and an exit opening on a first end of the drum. The method further includes positioning a rotatable central mount within the drum, positioning a plurality of rotatable threshers in the drum, each of the rotatable threshers attached to the central rotatable mount and in line with at least one respective stationary thresher, attaching a plurality of cutters to the outer shell, positioning a flame source to project a flame into the drum, and positioning a water source to project water into the drum. The cut crop is caused to pass into the cut crop opening, to be further cut by the plurality of cutters and threshed by the plurality of rotatable threshers, such that the flame is projected onto the cut crop, and the water is projected onto the cut crop, resulting in a processed crop and detritus that is separated from the processed crop.

Various other features and advantages will be made apparent from the following detailed description and the drawings.

DETAILED DESCRIPTION

The operating environment of the disclosed system and method is a method of farming or growing and processing crops. More specifically, the disclosed system and method is directed toward harvesting green chick peas. The chick peas may be harvested approximately 100 days from planting, however according to the disclosure the chick peas may be harvested at any time during the growing process. Chick peas may be considered to be 'green' when in a pre-mature state. That is, green chickpeas are in a live green state and, when harvested and processed as such, they typically retain their nutritional value, as well as their color and moisture. Typically, processing green chick peas includes blanching or freezing.

However, according to the disclosure, green chick peas are harvested and flame roasted in situ, or immediately upon harvesting. That is, according to the disclosure, a combine or harvester is deployed in a field of green chick peas, with the stalks cut, moved or conveyed into a drum within the harvester, where the green chick peas (still on the plant) are threshed and flame roasted, so that the chick peas themselves are removed from the stalk after having been flame-roasted, and stored for further processing.

Figure 1:
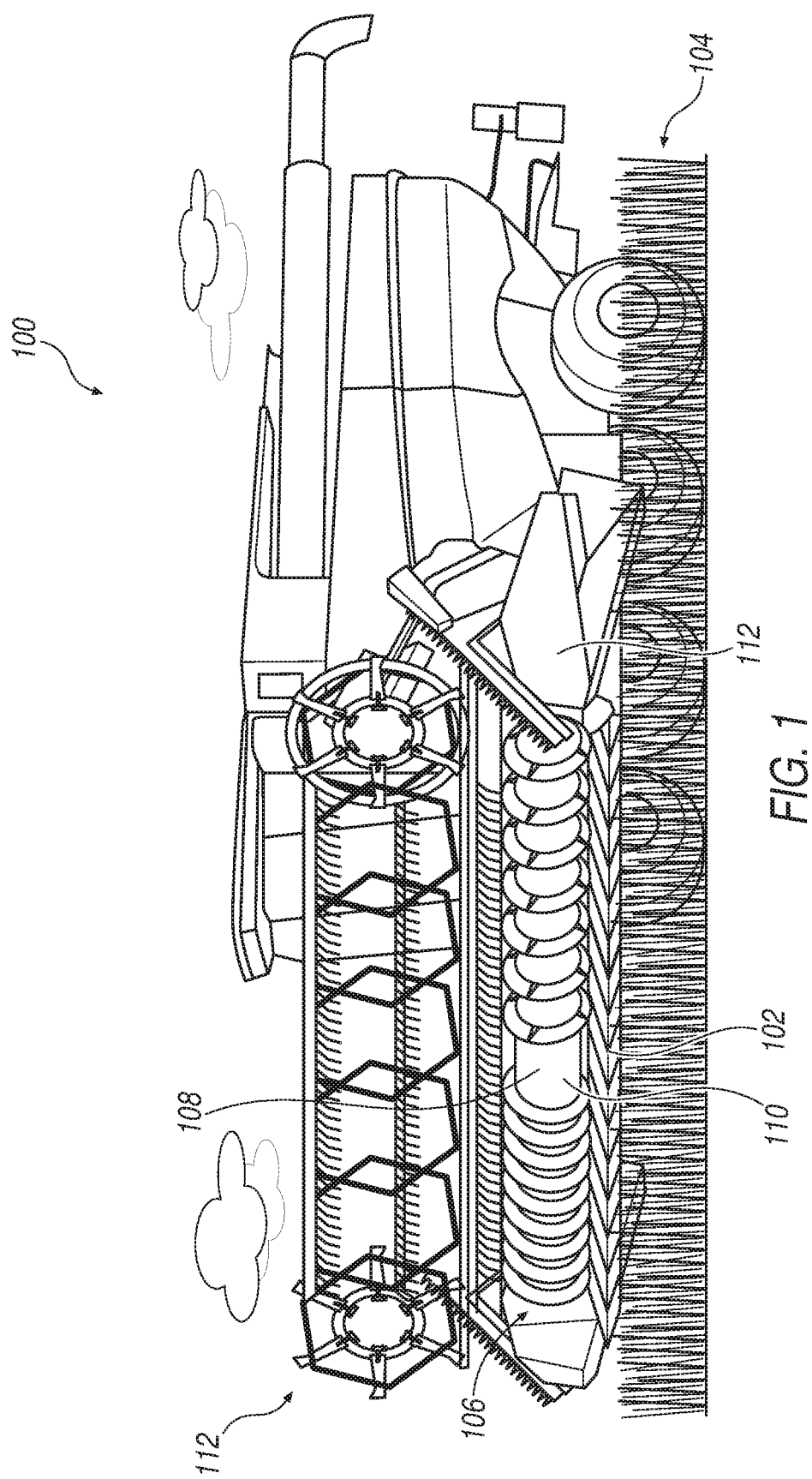
FIG. 1 is perspective view of a farm implement for harvesting chick peas according to the disclosure.

FIG. 1 is perspective view of a farm implement, combine, or harvester 100 for harvesting chick peas according to the disclosure. Harvester 100 includes a set of cutters 102, shown in FIG. 1 in an elevated position above a crop 104 of green chick peas. Harvester 100 also includes a set of helical devices 106, which are caused to rotate during movement of harvester 100. Being caused to rotate, helical devices 106 are each directed toward an approximate center 108 of a rotating shaft 110. As such, in operation, cutters 102 include, as one example, reciprocating cutters that cut a crop, such as green chick peas that are still on the plant, and helical devices 110 are caused to direct the cut crop toward center 108, while also projecting or flinging the cut crop in a backward direction and toward harvester 100.

Harvester 100 includes other farming or harvesting implements, such as a rotating device 112. According to the disclosure, harvester 100 may include rotating device 112 or other farming implements that may provide additional functionality beyond flame-roasting of green chick peas. According to the disclosure, helical devices 106 may be cantilever supported by a cantilever 112, itself supported by or attached to harvester 100. However, according to the disclosure, helical devices 106 may be mounted on a rotating shaft which itself is supported by rolling elements such as wheels. In addition, although cutters 102 and helical devices 110 are illustrated and described, it is contemplated that green chick peas may be initially processed, by cutting and conveying the stalks with chick peas into the harvester, using other known methods. Thus, according to the disclosure, it is contemplated that any known harvesting method or apparatus may be employed for initially cutting the stalks with green chick peas, and conveying the stalks into harvester 100.

Figure 2:
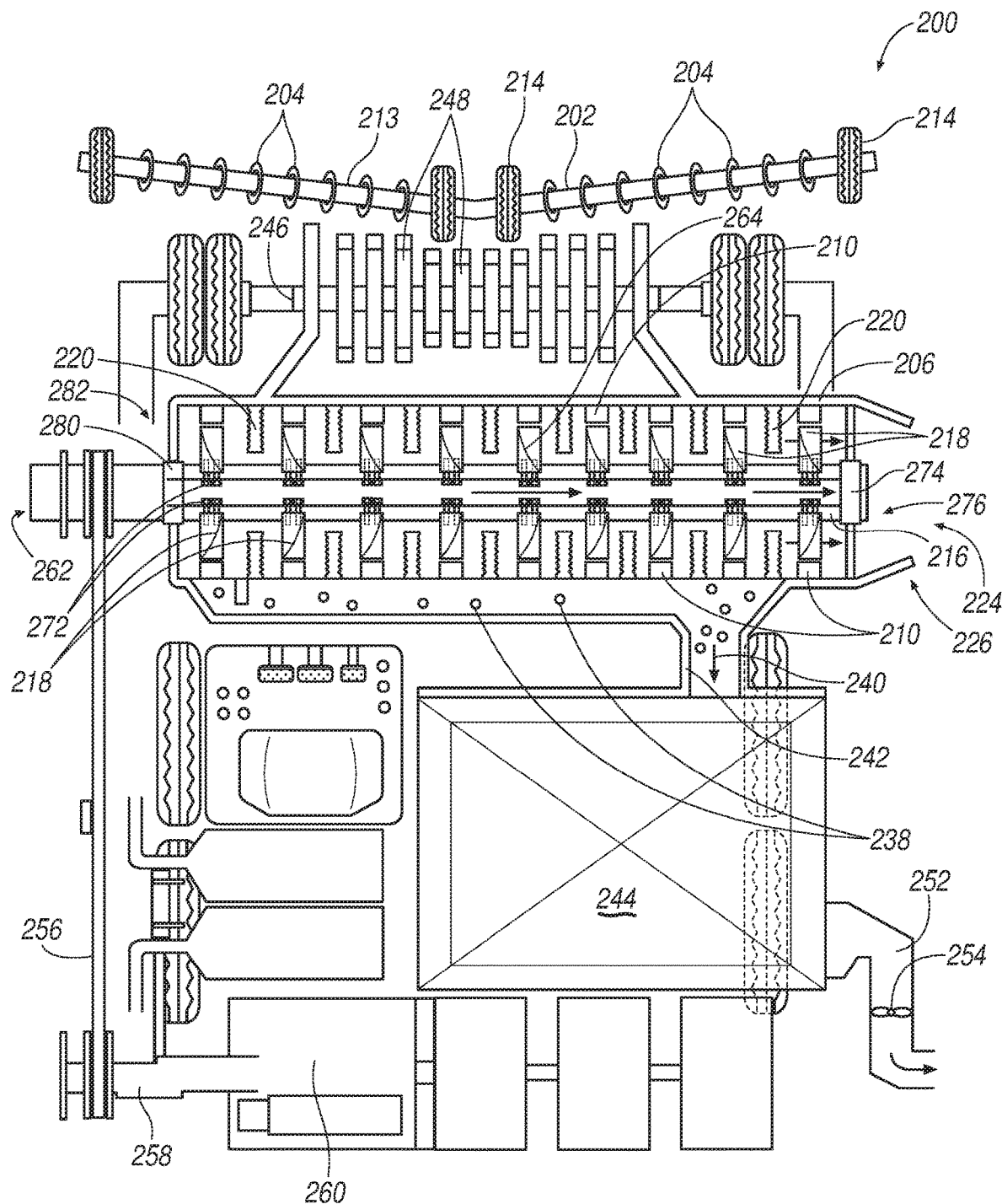
FIG. 2 is a plan view of a portion of the farm implement of FIG. 1, showing cutters and other features according to one aspect of the disclosure.
Figure 3:
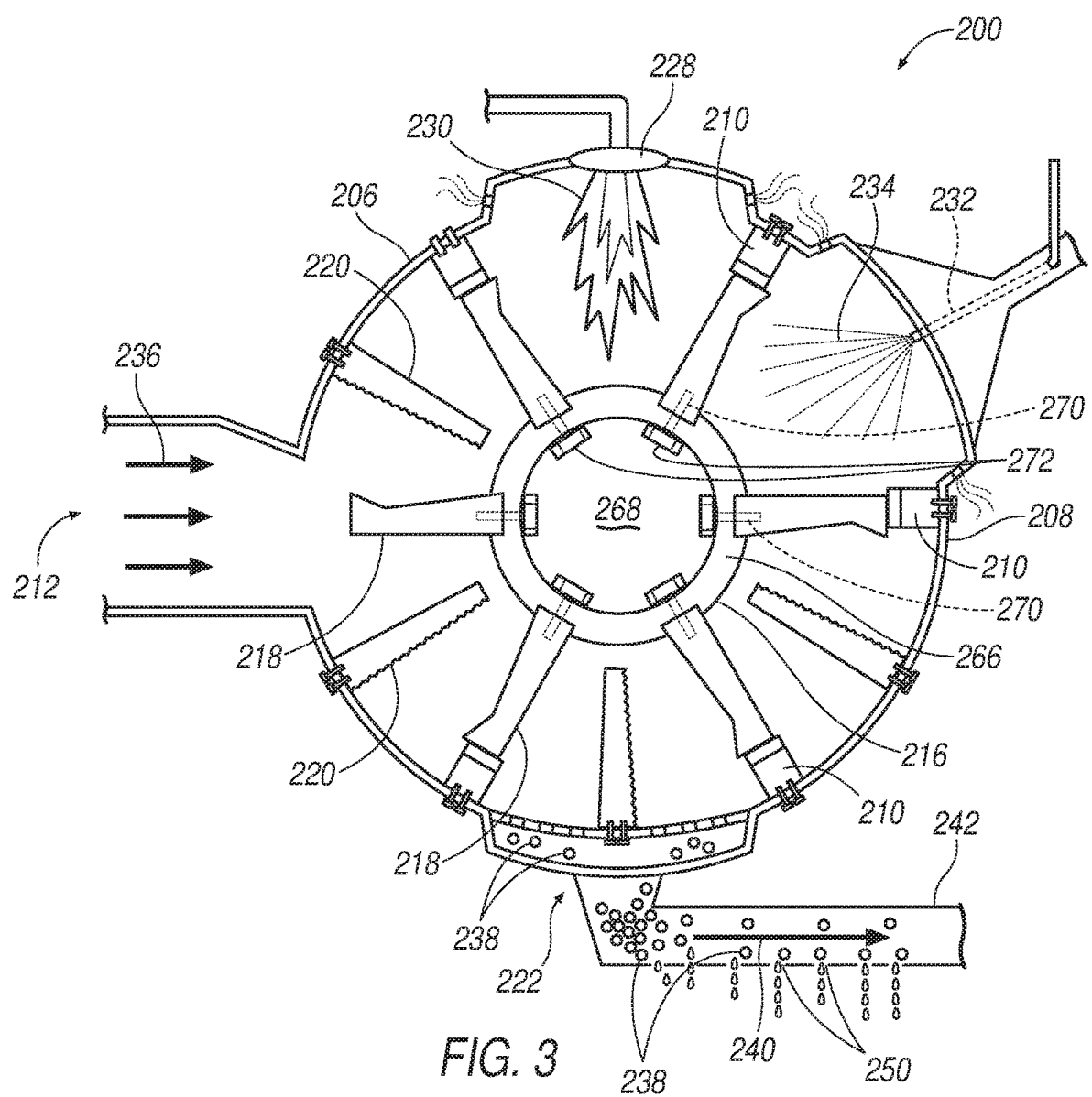
FIG. 3 is a cross-sectional view of a portion of the farm implement of FIG. 1, showing cutters and a flame roaster according to one aspect of the disclosure.

FIG. 2 is a plan view of a portion of the farm implement of FIG. 1, showing cutters and other features according to one aspect of the disclosure, referred to generally as harvester 200. FIG. 3 is a cross-sectional view 300 of a portion of the harvester of FIG. 1, showing cutters and a flame roaster according to one aspect of the disclosure. Referring to FIGS. 2 and 3, harvester 200 includes cutters, not shown in FIG. 2, which correspond with cutters 102 of FIG. 1. Harvester 200 includes a first rotatable shaft 202 having components attached thereto that cut a crop and pass the cut crop, via helical elements 204, in a rearward direction of the harvester, and a drum 206. Drum 206 includes an outer shell 208 having a plurality of stationary threshers 210 and a cut crop opening 212, which is positioned to receive cut crop from helical elements 204.

As indicated, helical elements 204 are supported by a shaft 213, which itself may be supported by wheels 214. However, as also indicated, shaft 213 may be cantilever supported by harvester 200, having cutters (shown in FIG. 1 as cutters 102) positioned beneath shaft 213. Harvester 200 includes a rotatable central mount 216, and a plurality of rotatable threshers 218 therein. Each of the rotatable threshers 218 is attached to central rotatable mount 216 and is in line with at least one respective stationary thresher 210. A plurality of cutters 220 is attached to outer shell 208, and a product chute 222 is positioned at a base of drum 206. An exit opening 224 is located on a first end 226 of drum 206. A flame source 228 is positioned to project a flame 230 into drum 206. A water source 232 is positioned to project water 234 into drum 206. Cut crop (not shown) is caused to pass 236 into cut crop opening 212, to be further cut by plurality of cutters 220 and threshed by plurality of rotatable threshers 218, such that flame 230 is projected onto the cut crop, and water 234 is projected onto the cut crop, resulting in a processed crop and detritus that is separated from the processed crop. The detritus is not shown, although the processed crop (being primarily chick peas 238) passes 240 through a passageway 242 to a storage bin 244 that is coupled to product chute 222. Product chute 222 is positioned at the base of drum 206 such that, in one example, gravity feeds the processed crop into product chute 222 and into storage bin 244.

Thus, in operation, green chick peas are first cut by cutters 102, accumulated via helical elements 204, and passed to drum 206 through cut crop opening 212. Rotatable threshers 218 are rotated by a rotating operation of central rotatable mount 216, and cut product is threshed against stationary threshers 210. The threshing and rotational operations cause cut product to further impinge upon cutters 220, causing further reduction of the cut product, resulting in detritus (generally defined as stalks, leaves, etc. . . . resulting from the removal of chick peas) passing to exit opening 224, and chick peas 238 dropping to the bottom of drum 206 and to product chute 222. During the threshing and cutting, flame 230 is also impinged on the cut product, further enhancing or accelerating the cutting and threshing process, and causing a flame roasting effect of the green chick peas. The green chick peas are generally heated in the process of separation from the detritus, and thus water 234 further causes a simultaneous, or near simultaneous, wetting and cooling of both the detritus and chick peas 238. The rotational action may cause chick peas 238 and detritus to encounter rotatable threshers 218, stationary threshers 210, cutters 220, flame 230, and water 234, numerous times on the journey to respectively product chute 222 and exit opening 224.

According to the disclosure, harvester 100/200 may include a second rotatable shaft 246 that is positioned between rotatable shaft 202 and drum 206. Second rotatable shaft 246 in one example includes a plurality of feeders 248 that feed cut crop from rotatable shaft 202 to cut crop opening 212.

Further, product chute 222 in one example includes a plurality of drainage holes 250 such that water on the processed crop passes from the processed crop and through the drainage holes 250. Additionally, storage bin 244 includes an air passageway 252, and further includes, in this example, a fan 254 coupled to air passageway 252, such that operation of fan 254 causes a suction in storage bin 244, drawing the processed crop from product chute 222 and into storage bin 244.

According to another example, harvester 100/200 includes a drive belt 256 coupled to an output shaft 258 of an engine 260 of harvester 100/200, and drive belt 256 is also coupled to an end 262 of rotatable central mount 216, causing a rotation of central mount 216.

In one example, rotatable threshers 218 each include a propeller shape 264, causing the cut crop to pass toward exit opening 224 during rotation of central mount 216 and during a threshing of the cut crop, by rotatable threshers 218, as it passes toward exit opening 224. That is, propeller shape 264 causes a fanning effect, much like a fan for moving air, which moves cut product and detritus toward exit opening 224.

Also according to the disclosure, rotatable central mount 216 includes a cylindrical wall 266 and an inner passageway 268 within cylindrical wall 266. Cylindrical wall 266 includes a plurality of bolt holes 270 through which bolts 272 pass and into respective rotatable threshers 218, mounting each of the plurality of rotatable threshers 218 to cylindrical wall 266.

Figure 4:
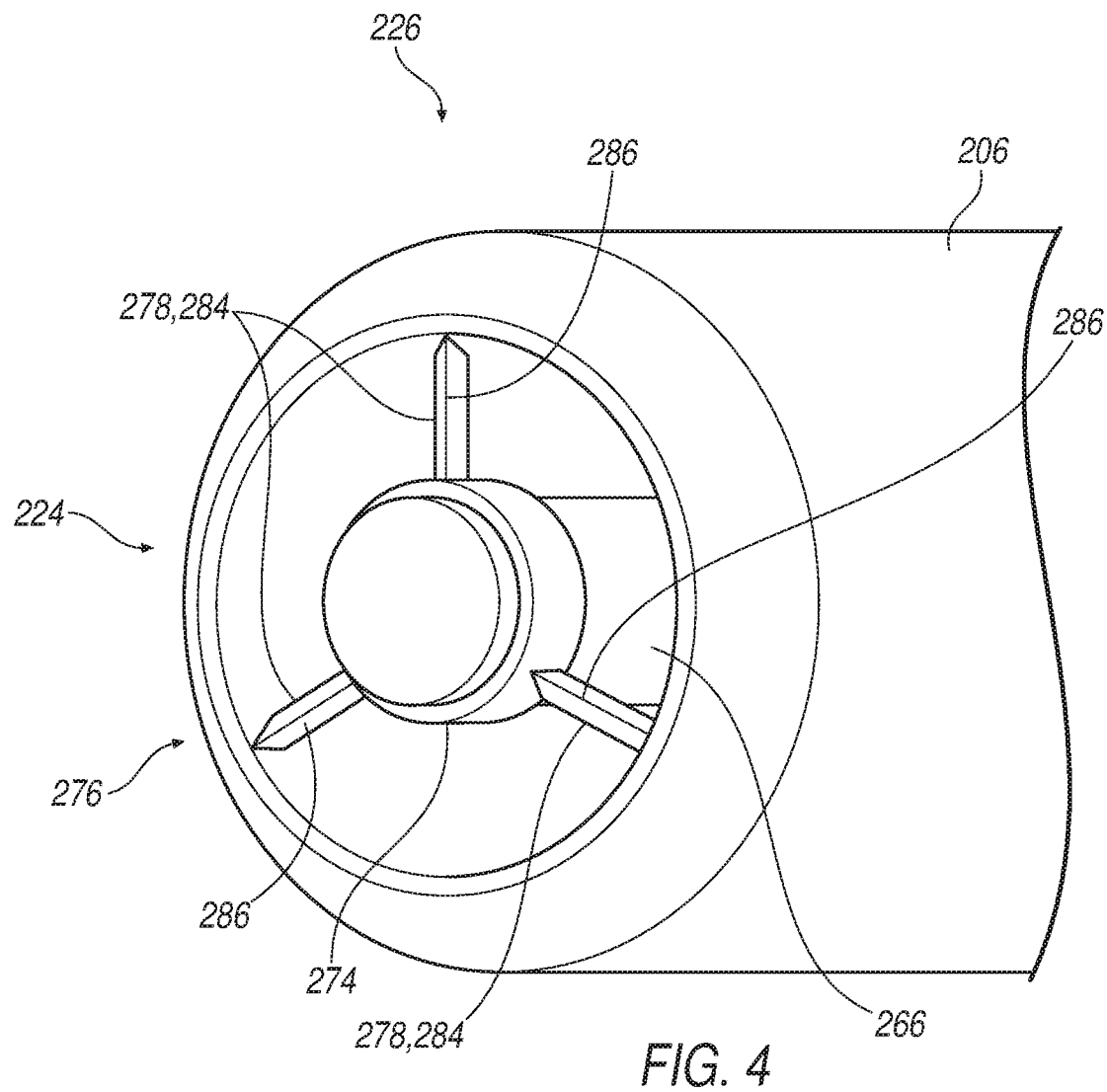
FIG. 4 is a perspective view of an exit portion of the farm implement of FIG. 1, through which flame-roasted chick peas pass, according to the disclosure.

As indicated, and referring also to FIG. 4, detritus passes to exit opening 224. However, as illustrated, central mount 216 is supported by a bearing 274. Accordingly, so that detritus may pass through exit opening 224 (and is ejected onto a farm field outside of harvester 100/200), a passageway 276 is included, as an example, so as not to impede the movement of detritus. As such, harvester 100/200 includes a bearing support 278 positioned at first end 226, proximate exit opening 224, of drum 206 and bearing support 278 is attached to drum 206. Bearing 274 is positioned within bearing support 278. A bearing 280 is configured to support the rotatable central mount at a second end 282 of rotatable central mount 216. Bearing 274 is positioned within bearing support 278, and bearing 274 is configured to support rotatable central mount 216 at first end 226 of rotatable central mount 216. Bearing support 278 includes, in the illustrated example, stationary support prongs 284 that are positioned between bearing 274 and drum 206. Stationary support prongs 284 each include a knife-edge 286 facing toward second end 282 of rotatable central mount 216 such that detritus passes unimpeded by stationary support prongs 284.

Disclosed herein also is a method of manufacturing a combine for harvesting chick peas. The method includes attaching components to a first rotatable shaft that cut a crop and pass the cut crop in a rearward direction of the combine, and providing a drum having an outer shell, the drum having a plurality of stationary threshers, a cut crop opening, a product chute at a base of the drum, and an exit opening on a first end of the drum. The method further includes positioning a rotatable central mount within the drum, positioning a plurality of rotatable threshers in the drum, each of the rotatable threshers attached to the central rotatable mount and in line with at least one respective stationary thresher, attaching a plurality of cutters to the outer shell, positioning a flame source to project a flame into the drum, and positioning a water source to project water into the drum. The cut crop is caused to pass into the cut crop opening, to be further cut by the plurality of cutters and threshed by the plurality of rotatable threshers, such that the flame is projected onto the cut crop, and the water is projected onto the cut crop, resulting in a processed crop and detritus that is separated from the processed crop.

The disclosed method includes attaching components to a first rotatable shaft that cut a crop and pass the cut crop in a rearward direction of the combine, providing a drum having an outer shell, the drum having a plurality of stationary threshers, a cut crop opening, a product chute at a base of the drum, and an exit opening on a first end of the drum, and positioning a rotatable central mount within the drum. The method further includes positioning a plurality of rotatable threshers in the drum, each of the rotatable threshers attached to the central rotatable mount and in line with at least one respective stationary thresher, attaching a plurality of cutters to the outer shell, positioning a flame source to project a flame into the drum, and positioning a water source to project water into the drum. The cut crop is caused to pass into the cut crop opening, to be further cut by the plurality of cutters and threshed by the plurality of rotatable threshers, such that the flame is projected onto the cut crop, and the water is projected onto the cut crop, resulting in a processed crop and detritus that is separated from the processed crop.

The disclosed method further includes positioning a second rotatable shaft between the first rotatable shaft and the drum, the second rotatable shaft having a plurality of feeders that feed the cut crop from the first rotatable shaft to the cut crop opening, and coupling a storage bin to the product chute, wherein the product chute is positioned at the base of the drum such that gravity feeds the processed crop into the product chute and into the storage bin.

The product chute includes a plurality of drainage holes such that water on the processed crop passes from the processed crop and through the drainage holes. The storage bin includes an air passageway, and further comprising coupling a fan to the air passageway, such that operation of the fan causes a suction in the storage bin, drawing the processed crop from the product chute and into the storage bin.

The disclosed method further includes coupling a drive belt to an output shaft of an engine of the combine, and coupling the drive belt to a first end of the rotatable central mount, causing a rotation of the central mount. The plurality of rotatable threshers each includes a propeller shape, causing the cut crop to pass toward the exit opening during the rotation of the central mount and during a threshing of the cut crop, by the plurality of rotatable threshers, as it passes toward the exit opening.

The disclosed method further includes positioning a bearing support at the first end of the drum and attached to the drum, positioning a bearing within the bearing support, the bearing configured to support the rotatable central mount at a second end of the rotatable central mount, and positioning stationary support prongs between the bearing support and the drum.

The stationary support prongs each include a knife-edge facing toward the first end of the rotatable shaft such that detritus passes unimpeded by the stationary support prongs. The rotatable central mount includes a cylindrical wall and an inner passageway within the cylindrical wall, the cylindrical wall including a plurality of bolt holes through which bolts pass and into respective threshers of the plurality of rotatable threshers, mounting each of the plurality of rotatable threshers to the cylindrical wall.

According to the disclosure, a combine for harvesting chick peas includes a first rotatable shaft having components attached thereto that cut a crop and pass the cut crop in a rearward direction of the combine and a drum. The drum includes an outer shell having a plurality of stationary threshers and a cut crop opening, a rotatable central mount, a plurality of rotatable threshers therein, each of the rotatable threshers attached to the central rotatable mount and in line with at least one respective stationary thresher, a plurality of cutters attached to the outer shell, and a product chute at a base of the drum. The drum also includes an exit opening on a first end of the drum, a flame source positioned to project a flame into the drum, and a water source positioned to project water into the drum. The cut crop is caused to pass into the cut crop opening, to be further cut by the plurality of cutters and threshed by the plurality of rotatable threshers, such that the flame is projected onto the cut crop, and the water is projected onto the cut crop, resulting in a processed crop and detritus that is separated from the processed crop.

It is to be understood that the above description is intended to be illustrative and not restrictive. Many applications other than the examples provided would be upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the disclosure is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A combine for harvesting chick peas, comprising:
   a first rotatable shaft having cutters attached thereto that cut a crop and elements attached thereto that pass the cut crop in a rearward direction of the combine; and
   a drum comprising:
   an outer shell having a plurality of stationary threshers and a cut crop opening;
   a rotatable central mount;
   a plurality of rotatable threshers therein, each of the rotatable threshers attached to the rotatable central mount and in line with at least one respective stationary thresher;
   a plurality of cutters attached to the outer shell;
   a product chute at a base of the drum;
   an exit opening on a first end of the drum;
   a flame source positioned to project a flame into the drum; and
   a water source positioned to project water into the drum;
   wherein the cut crop is caused to pass into the cut crop opening, to be further cut by the plurality of cutters and threshed by the plurality of rotatable threshers, such that the flame is projected onto the cut crop, and the water is projected onto the cut crop, resulting in a processed crop and detritus that is separated from the processed crop.

2. The combine of claim 1, further comprising a second rotatable shaft positioned between the first rotatable shaft and the drum, the second rotatable shaft having a plurality of feeders that feed the cut crop from the first rotatable shaft to the cut crop opening.

3. The combine of claim 1, further comprising a storage bin that is coupled to the product chute, wherein the product chute is positioned at the base of the drum such that gravity feeds the processed crop into the product chute and into the storage bin.

4. The combine of claim 3, wherein the product chute includes a plurality of drainage holes such that water on the processed crop passes from the processed crop and through the drainage holes.

5. The combine of claim 3, wherein the storage bin includes an air passageway, and further comprising a fan coupled to the air passageway, such that operation of the fan causes a suction in the storage bin, drawing the processed crop from the product chute and into the storage bin.

6. The combine of claim 1, further comprising a drive belt coupled to an output shaft of an engine of the combine, and the drive belt is also coupled to a first end of the rotatable central mount, causing a rotation of the central mount.

7. The combine of claim 6, wherein the plurality of rotatable threshers each includes a propeller shape, causing the cut crop to pass toward the exit opening during the rotation of the central mount and during a threshing of the cut crop, by the plurality of rotatable threshers, as the cut crop passes toward the exit opening.

8. The combine of claim 7, further comprising:
   a bearing support positioned at the first end of the drum and attached to the drum;
   a bearing positioned within the bearing support, the bearing configured to support the rotatable central mount at the first end of the rotatable central mount; and
   stationary support prongs positioned between the bearing and the drum.

9. The combine of claim 8, wherein the stationary support prongs each include a knife-edge facing toward a second end of the rotatable central mount that detritus passes unimpeded by the stationary support prongs.

10. The combine of claim 1, wherein the rotatable central mount includes a cylindrical wall and an inner passageway within the cylindrical wall, the cylindrical wall including a plurality of bolt holes through which bolts pass and into respective threshers of the plurality of rotatable threshers, mounting each of the plurality of rotatable threshers to the cylindrical wall.

11. A method of manufacturing a combine for harvesting chick peas, comprising:
    attaching cutters to a first rotatable shaft that cut a crop and elements that pass the cut crop in a rearward direction of the combine;
    providing a drum having an outer shell, the drum having a plurality of stationary threshers, a cut crop opening, a product chute at a base of the drum, and an exit opening on a first end of the drum;
    positioning a rotatable central mount within the drum;
    positioning a plurality of rotatable threshers in the drum, each of the rotatable threshers attached to the rotatable central mount and in line with at least one respective stationary thresher;
    attaching a plurality of cutters to the outer shell;
    positioning a flame source to project a flame into the drum; and
    positioning a water source to project water into the drum;
    wherein the cut crop is caused to pass into the cut crop opening, to be further cut by the plurality of cutters and threshed by the plurality of rotatable threshers, such that the flame is projected onto the cut crop, and the water is projected onto the cut crop, resulting in a processed crop and detritus that is separated from the processed crop.

12. The method of claim 11, further comprising positioning a second rotatable shaft between the first rotatable shaft and the drum, the second rotatable shaft having a plurality of feeders that feed the cut crop from the first rotatable shaft to the cut crop opening.

13. The method of claim 11, further comprising coupling a storage bin to the product chute, wherein the product chute is positioned at the base of the drum such that gravity feeds the processed crop into the product chute and into the storage bin.

14. The method of claim 13, wherein the product chute includes a plurality of drainage holes such that water on the processed crop passes from the processed crop and through the drainage holes.

15. The method of claim 13, wherein the storage bin includes an air passageway, and further comprising coupling a fan to the air passageway, such that operation of the fan causes a suction in the storage bin, drawing the processed crop from the product chute and into the storage bin.

16. The method of claim 11, further comprising coupling a drive belt to an output shaft of an engine of the combine, and coupling the drive belt to a first end of the rotatable central mount, causing a rotation of the central mount.

17. The method of claim 16, wherein the plurality of rotatable threshers each includes a propeller shape, causing the cut crop to pass toward the exit opening during the rotation of the central mount and during a threshing of the cut crop, by the plurality of rotatable threshers, as the cut crop passes toward the exit opening.

18. The method of claim 17, further comprising:
positioning a bearing support at the first end of the drum and attached to the drum;
positioning a bearing within the bearing support, the bearing configured to support the rotatable central mount at the first end of the rotatable central mount; and
positioning stationary support prongs between the bearing support and the drum.

19. The method of claim 18, wherein the stationary support prongs each include a knife-edge facing toward a second end of the rotatable central mount such that detritus passes unimpeded by the stationary support prongs.

20. The method of claim 11, wherein the rotatable central mount includes a cylindrical wall and an inner passageway within the cylindrical wall, the cylindrical wall including a plurality of bolt holes through which bolts pass and into respective threshers of the plurality of rotatable threshers, mounting each of the plurality of rotatable threshers to the cylindrical wall.

\* \* \* \* \*